US 8,095,970 B2

(12) United States Patent
Irani et al.

(10) Patent No.: US 8,095,970 B2
(45) Date of Patent: Jan. 10, 2012

(54) DYNAMICALLY ASSOCIATING ATTRIBUTE VALUES WITH OBJECTS

(75) Inventors: Khushru M. Irani, Redmond, WA (US); William S. Jack, III, Redmond, WA (US); Greg Johnson, East Wenatchee, WA (US); Colin Brace, Seattle, WA (US); Gokay K. Hurmali, Redmond, WA (US); Qi Cao, Bellevue, WA (US); William James Whalen, Seattle, WA (US); Umit Akkus, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/855,385

(22) Filed: Sep. 14, 2007

(65) Prior Publication Data

US 2008/0201761 A1    Aug. 21, 2008

Related U.S. Application Data

(60) Provisional application No. 60/901,940, filed on Feb. 16, 2007.

(51) Int. Cl.
*G06F 7/04* (2006.01)
*G06F 17/30* (2006.01)
*G06F 21/00* (2006.01)

(52) U.S. Cl. .............. 726/6; 726/1; 726/18; 726/21; 713/183

(58) Field of Classification Search .......... 713/183–184; 726/26–29, 6; 711/164
See application file for complete search history.

(56) References Cited

U.S. PATENT DOCUMENTS

| 5,077,795 | A  | * | 12/1991 | Rourke et al. ............... 380/55 |
| 5,922,073 | A  | * | 7/1999  | Shimada ..................... 726/6 |
| 6,466,932 | B1 | * | 10/2002 | Dennis et al. ............... 710/33 |
| 6,618,806 | B1 | * | 9/2003  | Brown et al. ............... 713/186 |
| 6,671,695 | B2 | * | 12/2003 | McFadden .................. 707/656 |
| 6,865,580 | B1 |   | 3/2005  | Bush ....................... 707/103 Y |
| 6,928,547 | B2 | * | 8/2005  | Brown et al. ............... 713/186 |
| 7,000,116 | B2 | * | 2/2006  | Bates et al. ................ 713/182 |
| 7,107,538 | B1 |   | 9/2006  | Hinckley et al. ............ 715/743 |

(Continued)

FOREIGN PATENT DOCUMENTS

KR    10-2002-0032892 A    5/2002

(Continued)

OTHER PUBLICATIONS

Abstract, "Experience with an Interactive Attribute-Based User Information Environment," Craig E. Willis, Dominic Giampaolo, and Michael Mackovitch, Computer Science Department, Worcester Polytechnic Institute, Worcester MA 01609, WPI-CS-TR-94-2, Mar. 1995 (date obtained from IEEE Explore reference, cited below).

(Continued)

*Primary Examiner* — Nathan Flynn
*Assistant Examiner* — Carolyn B Kosowski
(74) *Attorney, Agent, or Firm* — Merchant & Gould

(57) ABSTRACT

Dynamically associating an attribute and an associated value to an object includes dynamically associating attribute-value sets to an object, but is not so limited. An exemplary system includes a directory component that can be configured to dynamically assign different values, for a set attributes, to an object. An exemplary directory application can be configured to select an attribute-value set for an object based in part on a group membership determination, and a precedence parameter associated with an attribute-value, set, or other grouping. Other embodiments are available.

18 Claims, 4 Drawing Sheets

U.S. PATENT DOCUMENTS

| | | | |
|---|---|---|---|
| 7,203,906 B2 | 4/2007 | Abbott et al. | 345/708 |
| 7,373,659 B1* | 5/2008 | Vignoles et al. | 726/11 |
| 7,428,754 B2* | 9/2008 | Neumann et al. | 726/15 |
| 7,478,422 B2* | 1/2009 | Valente et al. | 726/4 |
| 7,546,629 B2* | 6/2009 | Albert et al. | 726/1 |
| 7,546,633 B2* | 6/2009 | Garg et al. | 726/4 |
| 7,703,667 B2* | 4/2010 | Koorland et al. | 235/375 |
| 7,747,719 B1* | 6/2010 | Horvitz et al. | 709/223 |
| 7,747,736 B2* | 6/2010 | Childress et al. | 709/224 |
| 7,752,408 B2* | 7/2010 | Hashimoto et al. | 711/164 |
| 2005/0027713 A1* | 2/2005 | Cameron et al. | 707/100 |
| 2005/0273728 A1 | 12/2005 | Williams et al. | 715/809 |
| 2005/0285965 A1 | 12/2005 | Zimmer et al. | 348/333.11 |
| 2006/0004848 A1 | 1/2006 | Williams et al. | 707/103 |
| 2006/0026267 A1 | 2/2006 | Godin et al. | 709/220 |
| 2006/0106836 A1* | 5/2006 | Masugi et al. | 707/101 |
| 2006/0149768 A1 | 7/2006 | McCormack et al. | 707/1 |
| 2006/0167858 A1* | 7/2006 | Dennis et al. | 707/3 |
| 2006/0190425 A1 | 8/2006 | Chang et al. | 707/2 |
| 2007/0043716 A1 | 2/2007 | Blewer et al. | 707/5 |
| 2007/0214497 A1* | 9/2007 | Montgomery et al. | 726/4 |
| 2007/0226808 A1* | 9/2007 | Uchikawa | 726/27 |
| 2008/0022392 A1* | 1/2008 | Karpati et al. | 726/15 |
| 2009/0019514 A1* | 1/2009 | Hazlewood et al. | 726/1 |

FOREIGN PATENT DOCUMENTS

| | | | |
|---|---|---|---|
| KR | 10-2002-0055114 A | 7/2002 | |
| KR | 10-2003-0097321 A | 12/2003 | |
| KR | 10-2006-0070297 A | 6/2006 | |
| WO | WO 02-07037 A1 | 1/2002 | 17/60 |
| WO | WO 99-44137 A2 | 9/2009 | |

OTHER PUBLICATIONS

IEEE Explore Release 2.5, "Experience with Interactive Attribute-Based User Information Environment," Computers and Communication, 1995 Conference Proceedings of the IEEE Fourteenth Annual International Phoenix Conference, Issue 08-31, Mar. 1995, pp. 359-365.

IBM Research Report, "Individualized Privacy Policy Based Access Control," Kathryn A. Bohrer, Stephen E. Levy, Xuan Liu, Edith G. Schonberg, IBM Research Division, Thomas J. Watson Research Center, P.O. Box 218, Yorktown Heights, NY 10598. RC22756 (W0303-119), Mar. 21, 2003.

Sun Java™ System Directory Server 5.2 2005Q1 Administration Guide, "Chapter 5—Managing Identity and Roles," http.//docs.sun.com/source/817-7613/rolescos.html, 2005 (date obtained from Sun Java System Directory Server 5.2 Administration Guide, cited below).

Sun Java™ System Directory Server 5.2 Administration Guide 2005Q1, Part No: 817-7613-10, 2005 Sun Microsystems, Inc., 4150 Network Circle, Santa Clara, California 95054.

PCT Search Report dated Jun. 23, 2008 cited in International Application No. PCT/US2008/053358.

* cited by examiner

DYNAMICALLY ASSOCIATING ATTRIBUTE VALUES WITH OBJECTS

RELATED APPLICATIONS

This application claims the benefit of U.S. Provisional Application No. 60/901,940, filed Feb. 16, 2007, which is hereby incorporated by reference in its entirety.

BACKGROUND

Directory applications can be used to organize information, such as network users and resources associated with an enterprise. A particular directory may include a number of objects, wherein each object may include one or more associated attributes. The attributes may in turn have one or more associated values. As an example, a directory application may allow customers to set one password and account lockout setting for each domain user. If customers desire different password and account lockout settings for different sets of users, they may be required to either create a password filter or deploy multiple domains, which can be inefficient and time consuming.

SUMMARY

This summary is provided to introduce a selection of concepts in a simplified form that are further described below in the Detailed Description. This summary is not intended to identify, key features or essential features of the claimed subject matter, nor is it intended as an aid in determining the scope of the claimed subject matter.

Embodiments are provided to dynamically associate an attribute and an associated value to an object, including associating attribute-value sets to an object, but the embodiments are not so limited. In an embodiment, a system includes a directory component that can be configured to dynamically assign different values, for a set attributes, to an object.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
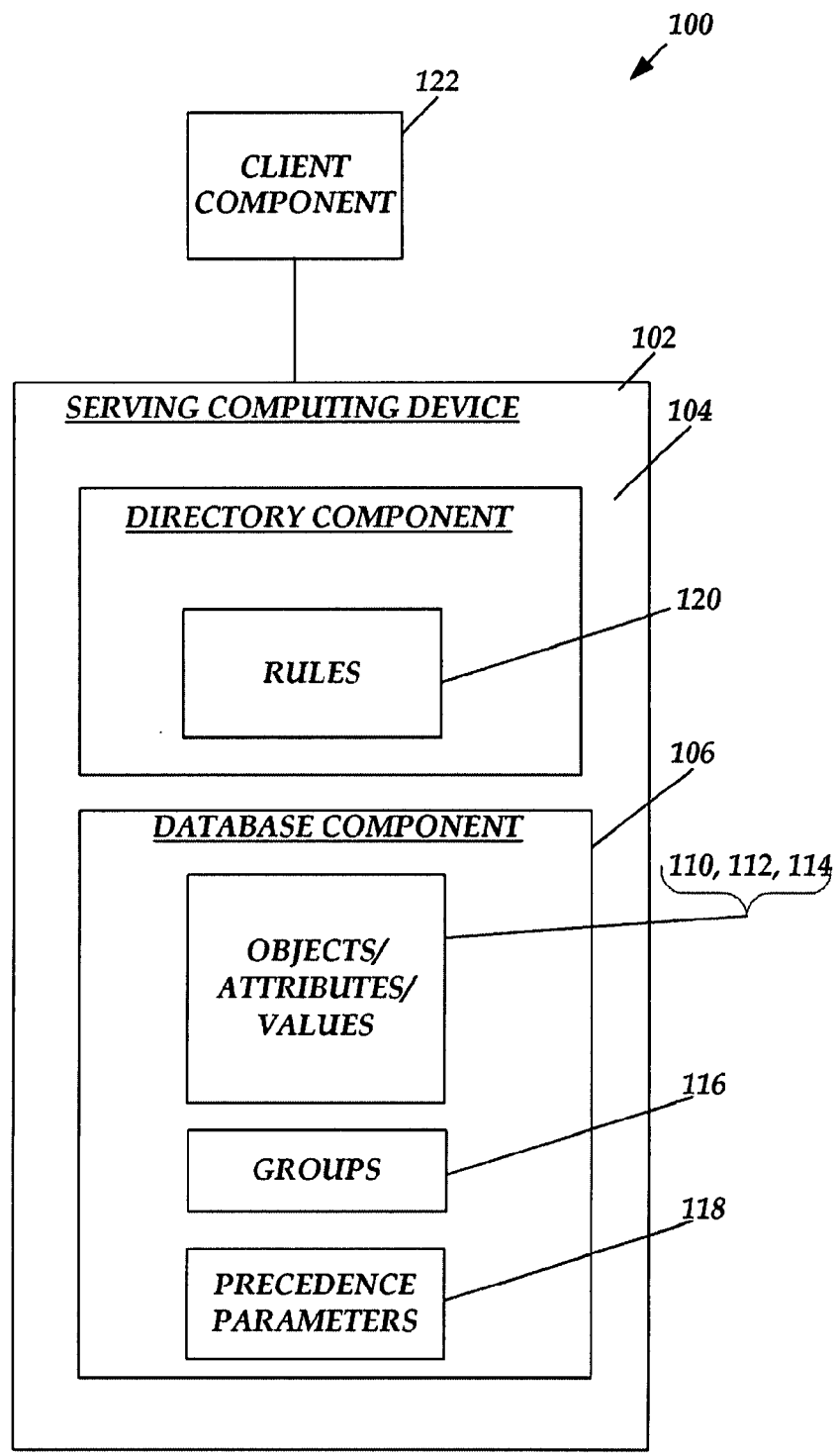
FIG. 1 depicts a block diagram of an example system configured to manage information.

Embodiments are provided to dynamically associate a set of attributes and corresponding values to an object, but the embodiments are not so limited. In an embodiment, a system includes a directory component that can be configured to dynamically assign different values, for a set attributes, to an object based in part on a number of rules that the object satisfies. In one embodiment, a system can be configured to select a set of attributes and corresponding values for any object based in part on a group membership associated with the object and a precedence number of an attribute set. Components of the system can also be used to assign precedence parameters and other parameters. Accordingly, the various embodiments provide an extensible mechanism to assign dynamic values to an object's attributes based in part on a number of rules that an object satisfies.

In an embodiment, a directory application can be configured to dynamically associate a set of attributes and corresponding values to an object based in part on a number of group and precedence rules. In one embodiment, the directory application can be configured as a software program that can operate to select a set of attributes and corresponding values for any object based in part on a group membership associated with an object and a precedence parameter associated with an attribute-value or attribute-value set. The directory application can be used to link or associate a set of attributes and corresponding values to a directory group, domain, or other construct. The directory application can further be used to associate a member of a group with a set of attributes and values.

The directory application may be further configured to use one or more rules and any associated parameters, such as one or more precedence-based rules and associated values for example, to resolve which attribute-value or values associated with an attribute set are to be assigned to an object. For example, the directory application can use a numerical determination or other ranking determination to select or assign an attribute-value or values associated with an attribute-value set to an object when the object is associated with multiple groups having a plurality of attribute-values or attribute-value sets.

For example, the directory application can be used with a directory having a number of objects to make various object-based determinations and assessments. The objects can include one or more associated attributes, and the one or more attributes can have one or more associated values. For example, if the object satisfied condition X, values a, b, and c can be associated with a first set of attributes and values l, m, and n can be associated with a second set of attributes. However, if the object satisfied condition Y, values e, f and g can be associated with the first set of attributes.

The embodiments described herein can be configured to associate a number of attributes and/or values with an object, including using groups, precedence rules and conditions. Precedence based rules may be used to determine which attribute-value set is to be associated with a user object. For example, user A may be a member of group X. User B may be a member of group Y. Based at least in part on the group memberships of user A and user B and one or more precedence parameters, an attribute-value set can be associated with each user.

The various embodiments can also be used with various operating systems, including but not limited to network operating systems, directory structures, and/or with other systems, devices, etc. In one embodiment, a directory component can be included as part of an operating system (OS), including the login and access functionality associated with the OS. The directory component can be used to dynamically associate information associated with an object, such as a user object for example. In certain embodiments, a number of application programming interfaces (APIs) can be used to implement a particular functionality of the directory component.

As one example, each enterprise user has an identity and a number of associated attributes (e.g., username, login password, etc.). The directory component can be used by the OS to organize object groups in certain directories. For example, a first group of users may be associated with a first directory based on an association with a certain project, whereas a second group of users may be associated with a second directory based on an association with a different type of project. Users may be assigned to different groups based on identity, project type, employment status, title, and other factors. Users may also be members of multiple groups. That is, a user may have multiple group memberships.

In one embodiment, a directory component can be used to assign attribute value(s) to an object. The directory component can be configured to use group membership parameters when including an object in a directory, wherein the object can be included as a member of one or more of the groups. A group can be also a member of one or more groups. To determine the group membership of an object, the directory component can operate to directly and/or transitively obtain a list of all the groups that a particular object belongs to.

The directory component can also be used to specify and use different password settings for different users based in part on a group membership parameter. Password setting may be controlled based in part on the nature of the system being accessed (e.g., secret, confidential, unaffiliated user, affiliated user, etc.). For example, a password setting may include a password length and a password expiration period. A system which includes trade secrets and other sensitive information may require a longer password and a shorter expiration period, due in part to the sensitive nature of the system. The directory component can use a precedence parameter, such as a precedence number associated with a password setting for example, when assigning a different attribute value or values associated with a set of attributes-values to an object based in part on a rule or a set of rules.

The embodiments described herein can be used with any object in a directory or other data structure to dynamically associate attribute-values and/or attribute-value sets to an object. The embodiments can be further extended to solve situations where an object may need to be assigned a different set of attributes and values depending on whether the object satisfies a certain set of rules, including precedence related rules and conditions.

FIG. 1 is a block diagram of a system 100 configured to dynamically associate and use a set of attributes and corresponding values associated with an object, under an embodiment. In one embodiment, components of the system 100 can be configured to dynamically associate attribute values with objects using a number of group and/or precedence parameters. In one embodiment, components of the system 100 can be configured to dynamically assign attribute value(s) to an object. For example, components of the system 100 can be used to specify password settings for certain users based in part on a group membership parameter and/or a precedence parameter when assigning a different attribute value or set of attribute values to an object based in part on a rule or a set of rules.

As shows in FIG. 1, the system 100 includes a serving computing device 102 that includes a directory component 104. The directory component 104 includes a database component 106, but is not so limited. While a number of components are shown to be included as part of the functionality of the serving computing device 102, other serving devices can be used to employ one or more of the components. For example, a structured query language (SQL) server can be used to implement the database component 106 and a separate dedicated server can be used in conjunction with the directory component 104. The database component 106 can be configured as a relational, multi-dimensional, or other data repository that includes data management functionality. Other computing device configurations and implementations are available.

The database component 106 is configured to store and maintain information. As shown, the database component 106 includes a number of objects 110, attributes 112, and values 114. The database component 106 also includes a number of groups 116 and precedence parameters 118, but is not so limited. For example, a first group may include a number of users or group members associated with a first domain and system type, and a second group may includes a number of users associated with a second domain and system type. As described below, a precedence parameter can be used when determining whether to assign an attribute-value or values associated with an attribute-value set to a user object. In an embodiment, the precedence parameters 118 comprise precedence numbers which can be used to determine an assignment of an attribute-value or values associated with an attribute-value set. In one embodiment, the directory component 104 can be configured as a software application which includes the functionality and applicability of a directory service application such as the ACTIVE DIRECTORY® directory software application.

The directory component 104 can be configured to include calculation and/or other functionality, including using a number of rules 120 or rule sets to dynamically associate an attribute value or values with an object. The rules 120 can be used to determine if an object satisfies a given condition, and a number of associated values can be assigned to the object if the condition is satisfied. For example, the rules 120 can be configured as a step by step assessment as follows: 1) If an attribute-value set is applied directly to a user object, the attribute-value set is the resultant attribute-value set; 2) If more than one attribute-value set is applied to the user object, sort the list of attribute-value sets based on a precedence parameter, wherein the attribute-value set with highest precedence parameter is the resultant attribute-value set; and, 3) If no attribute-value set is applied to the user object, determine a global group membership of the user and obtain all attribute-value sets that are applicable to the user based on the global group membership; 4) Sort out list of attribute-value sets obtained at 3) in order of precedence, wherein the attribute-value set with the highest precedence parameters is the resultant attribute-value set; and, 5) If no attribute-value set is obtained based on the foregoing, apply a default domain policy.

In one embodiment, the directory component 104 can be used to dynamically associate an attribute value or values with one or more objects using group and precedence-based rules and associated parameters. The directory component 104 can also be used to determine an attribute-value or attribute-value set that applies to an object based on certain inputs, but is not so limited. For example, the directory component 104 can be used to determine an attribute-value set that applies to an object based in part on a username and current password input by a user, wherein a precedence number can be used to dynamically assign different password attribute values to the user object based in part on a group membership determination.

Continuing with the example, assume that a user's password is to be changed according to a company policy to change passwords every 60 days. Based in part on the requested change, the directory component 104 can be used to determine if the newly submitted password is in accord with a particular policy associated with an attribute-value set. As used herein, an attribute-value set can include multiple attributes and associated values. For example, an attribute-value set may include a number of attribute-value pairs, wherein each attribute-value pair includes an attribute and an associated value (see FIGS. 3A-3B). Accordingly, the directory component 104 can be used to determine what attribute-value or attribute-value set applies to a submitted password. It is possible that an attribute-value set includes different password expiration periods, wherein a particular expiration period may be assigned to a user object based in part on a group membership of the user. As described below, the system 100 can also be used to ensure that an entered password is in accord with an associated policy by ensuring that the entered password is in accord with a proper attribute-value set that may be associated with the policy.

With continuing reference to FIG. 1, the system 100 can also include at least one client component 122 or other interface. While one client component 122 is shown, such as a rich client running on a computing device for example, the system 100 can include any number of clients. Moreover, the components of the system can communicate according to a wired, wireless, combination of wired and wireless, and other communication methods. In an embodiment, a user can use the client component 122 to maintain, arrange, and otherwise manage rules, objects, groups, attributes, values, precedence parameters, and/or other information associated with the directory component 104. For example, a user can use the client component 122 to define groups and precedence parameters associated with one or more objects which can then be stored in the database component 106. In one embodiment, the client component 122 can be configured as a user interface, such as a web-based interface for example, that a user can use when managing objects, groups, attributes, values, precedence parameters, and/or other information.

For example, a user can use the client component 122 to define which users are to be associated with one or more groups or domains. A number of attributes and a number of associated values can be defined based on a certain policy, or other reason, for each user group or groups. Correspondingly, a user can be identified by being a member of a certain group. In certain cases, a group may have one associated user. Furthermore, a user can be a member of multiple groups (see FIGS. 3A-3B for example). As described herein, components of the system 100 can be used to determine or identify any and all groups that a particular user is a member of or associated with.

As an illustrative example, suppose each attribute-value set is associated with a precedence number such as 1, 2, 3, etc. A user can use the client component 122 to assign a precedence number to each type of attribute-value set. In an alternative embodiment, a user can use the client component 122 to assign a precedence number to each attribute-value if there are multiple values associated with an attribute. Once assigned, the attribute-value sets can be associated with a group or groups, a domain or domain, a system or systems, or some other object or objects. Thereafter, the directory component 104 can operate to sort the list of attribute-values or attribute-value sets associated with groups which are associated to one or more objects, and assign an attribute-value or values associated with an attribute-value set to the user object according to a desired implementation, such as b, rank, order (descending, ascending, random, first, last, middle, etc.), or some other criteria.

For example, the rules 120 may be used by the directory component 104 to select an attribute-value set based on a lower precedence determination. If there is no attribute-value set, the rules 120 may direct the directory component 104 to use a default policy or some other desired policy. For example, the default policy can be associated with a default attribute-value set or specific policy associated with certain users. Accordingly, the system 100 is configured to use a default policy if there is no attribute-value set associated with the group or groups that a user is associated with. The processes described herein can be used when associating an attribute-value or attribute-value set with any type of object.

Moreover, components of the system 100 can be used to determine if there are any attribute-value sets associated with one or more identified groups. For example, assume that a user is a member of ten groups, and five of the groups have associated attribute-value sets. Components of the system 100 can be used to organize (e.g., sort) the attribute-value sets and to select an appropriate attribute-value set from the organized data structure, wherein the appropriate attribute-value set can be based on a defined policy, policies, or some other criteria. The system 100 can be used implement the defined policy for members of multiple groups, a member of no group, members of a single group, groups of no members, groups having certain user characteristics (e.g., security permissions, access levels, title, location, etc.), etc.

In one embodiment, one or more components of the system 100 can be configured as an application programming interface (API) or other interactive interface and used to add, delete, and/or modify, one or more groups, including attribute, value, precedence and other parameters associated with the one or more groups. For example, a user can use an API when defining attributes and values for various groups. An API, for example client component 122, can also be used to define one or more rules, including precedence-based rules that can be used when resolving attribute-value sets and/or password policies to be associated with users of the system 100.

The system 100 can be implemented as part of networked, distributed, or other computer-implemented environment. The system 100 and its components can communicate via a wired, wireless, and/or a combination of communication networks with other systems, component, and devices. A number of client computing devices, including desktop computers, laptops, handhelds, or other smart devices can interact with and/or be included as part of the system 100. In alternative embodiments, the various components can be combined and/or configured according to a desired implementation.

Figure 2:
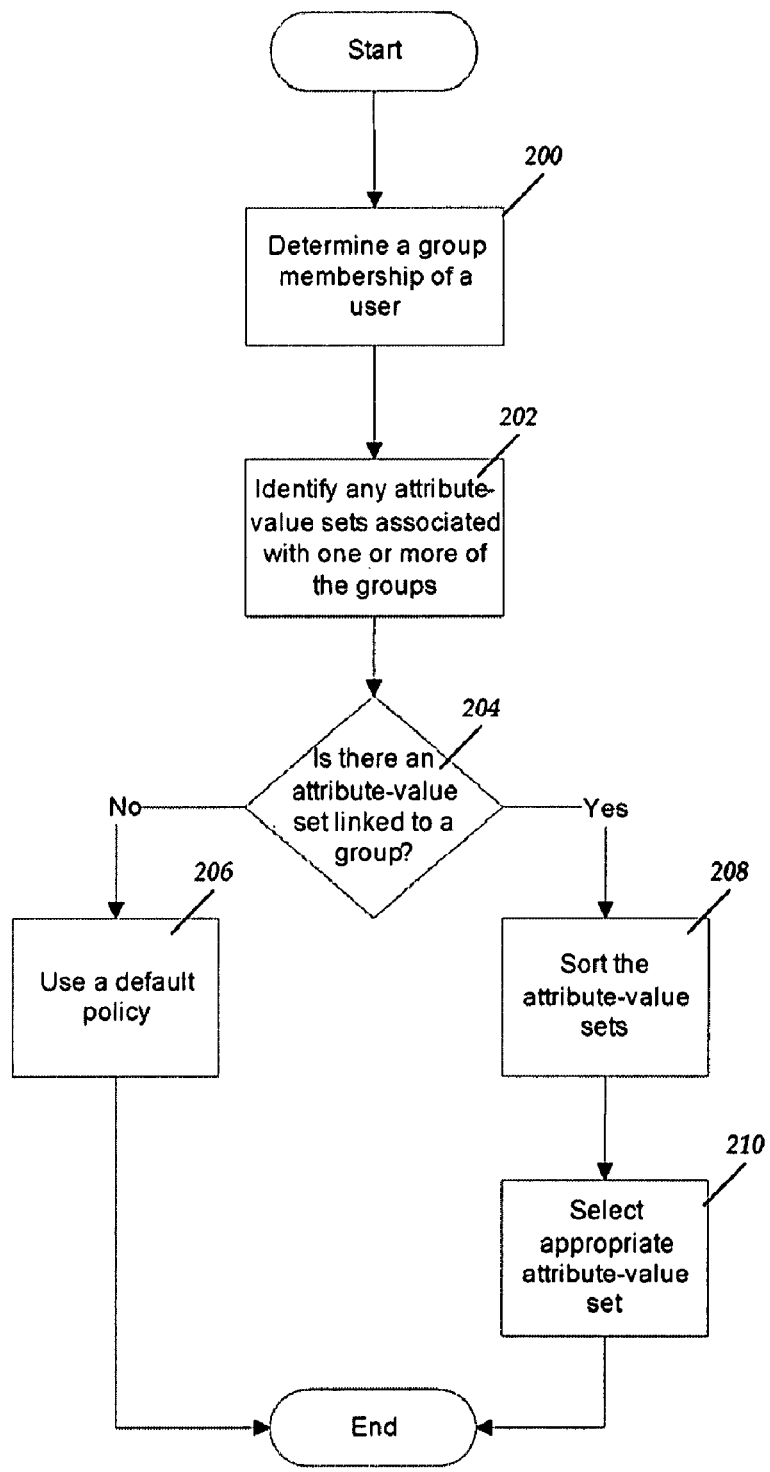
FIG. 2 is a flow diagram depicting an example use of a number of attribute-values or attribute-value sets.

FIG. 2 is a flow diagram depicting the use of a number of attribute-value sets, in accordance with an embodiment. Components of FIG. 1 are used in the description of FIG. 2, but the embodiments are not so limited and other component configurations are available. As described above, objects can be defined to include one or more attributes. For example, a user password can have a specified length attribute and an associated value, a valid use timeframe attribute and an associated value, and a complexity attribute and an associated value. Moreover, each attribute may have one or more associated values based in part on a defined relationship. As further example, an attribute-value set may include the same attribute with multiple values that may be assigned according to precedence and/or a group membership criterion.

FIG. 2 details a process that can be used to determine if an attribute-value set is linked to or associated with a group or groups, including a group member or members. Correspondingly, the flow can operate to identify any attribute-values or attribute-value sets associated with or linked to a group or groups and any users associated therewith. The flow can also be used to assign an attribute-value or values associated with an attribute-value set or sets to a user object, such as a password for example, based in part on a group membership determination and/or a precedence number. In an alternative embodiment, the flow can be used to identify any attribute-value and/or attribute-value set associated with or linked to a group or groups and any users associated therewith.

As described above, a user, such as an administrator for example, can use the client component 122 to maintain, arrange, and otherwise manage rules, objects, groups, attributes, values, precedence parameters, and/or other information associated with the directory component 104. For example, a user can use the client component to define which users are to be associated with one or more groups or domains. A user can also define a number of attribute-values, attribute-value sets, and/or precedence parameters that can be used in various operations described below. In one embodiment, an object table can include one or more password settings objects (PSOs) which can be used to represent one or more attribute-value sets. Once defined, the directory component 104 can use information of the database component 106 to determine whether there are one or more attribute-value sets linked to one or more groups and any associated users, but the embodiments are not so limited.

With continuing reference to FIG. 2, at 200, the directory component 104 can use the information of the database component 106 to determine a group membership of a user based in part on one or more rules 120 and/or other parameters. For example, the directory component 104 can use a username and a current password to ascertain whether a user belongs to one or more groups. In one embodiment, user credentials or other user information can be determined based on a user input or some other operation and used in the process and to determine group membership. For example, the directory component 104 can be configured to determine a group membership of a user based in part on group identification association which can use identity and other user information when making the group membership determination.

At 202, the directory component 104 can use information of the database component 106 to identify any potential attribute-values or attribute-value sets that may be associated with or linked to one or more of the groups in accordance with the group membership determination at 200. At 204, the directory component 104 operates to determine if there is an attribute-value or attribute-value set linked to or associated with a group based on the result at 202. For example, the directory component 104 can search through the database component 106 to locate any attribute-values or attribute-value sets that are associated with a particular group based at least in part on the group membership determination.

If there is no attribute-value or attribute-value set associated with the user's group or groups, at 206 the directory component 104 uses or assigns a default policy for the user. For example, a user may be part of a group that does not require passwords or does not have attribute-value sets associated with the group. The default policy can be set to expire after a certain amount of time or according to some other criteria. If there is more than one attribute-value or attribute-value set associated with the user's group or groups, at 208, the directory component 104 can operate to sort or otherwise organize the number of attribute-values or attribute-value sets. For example, the directory component 104 can be configured to sort a plurality of attribute-value sets in a numerical order, such as a descending, ascending, or some other order. In one embodiment, the directory component 104 can sort a list of attribute-values or attribute-value sets in accordance with a number of precedence parameters, such as by using one or more precedence numbers to identify one or more attribute-value sets for example.

At 210, the directory component 104 can select an appropriate or resultant attribute-value, attribute-value set, or attribute-value sets to be associated with the user based in part on the precedence parameters and associated rules 120. For example, if a user is associated with multiple groups, the directory component 104 can select the appropriate attribute-value set based at least in part on the lowest precedence number. Once selected, the attribute-value or attribute-value set can be used to implement a particular policy or other procedure. For example, a selected attribute-value set can be used to ensure that a submitted user password meets the characteristics of a set corresponding with a company password policy.

In one embodiment, a set of attributes can be fixed to a set of values that can be used to control user password complexity. For example, certain attributes may be associated with certain user objects based on a password policy (e.g. x number of characters and length of a password) or some other policy. Two examples of these attributes may be password length and password expiration. A default set of values can be assigned to these attributes, and any other sets can be defined by the users on a defined object. Every group may be linked to an attribute value set or implicitly linked to default attributes and values.

One issue stems from having static attributes and/or values. For example, a company may have a single password policy for the entire company; that is for all the users in the company domain. A domain may be part of an active directory structure. Thus, all the users in the company are associated with the same password policy and the company would like to assign different passwords and other criteria to certain employees based on different policies or other requirements. For example, a password policy can refer to password characteristics. That is, each password has to expire in so much time and have a certain format for example. In one embodiment, different password characteristic policies can be assigned to or associated with different sets of users. The password characteristic policies can be used to differentiate the users and to associate permissions and access credentials for example.

With continuing reference to FIG. 2, the following example illustrates the use of the flow in the context of a PSO. A PSO can be defined as an attribute-value set that includes one or more attribute-value pairs. For example, "password length of 10 characters" describes an attribute value pair, where "password length" is the attribute and "10 characters" is the associated value. As described below, FIG. 2 can be used in the context of using a PSO when associating a policy with a user or users. For example, a number of PSOs and/or precedence parameters can be used when assigning a new password length and an associated expiration date to a particular domain user. Again, components of FIG. 1 are used in the following description, but the embodiments are not so limited and other configurations are available. Moreover, as described above, a user can use the client component 122 to maintain, arrange, and otherwise manage rules, objects, groups, attributes, values, precedence parameters, and/or other information associated with the directory component 104 or some other component, device, domain, system, etc.

At 200, the directory component 104 can use the information of the database component 106 to determine or identify a user's group membership based in part on the identity of the user or other user data. At 202, the directory component 104 uses information of the database component 106 to determine if there are any PSOs linked to an identified group or groups. At 204, the directory component 104 uses information of the database component 106 to determine if there is a PSO linked to a group or groups. If there is no PSO associated with the user object(s) group or groups, at 206 the directory component 104 uses or assigns a default password policy. The default password policy can be set to expire after a certain amount of time or according to some other criteria. If there is more than one PSO associated with the user's group or groups, at 208, the directory component 104 operates to sort or otherwise organize the number of PSOs by some defined criteria, such as by precedence for example.

In one embodiment, the directory component 104 can sort a list of PSOs by a precedence parameter, such as precedence number for example. For example, the directory component 104 can sort a list of PSOs from a minimum precedence number to a maximum precedence number. At 210, the directory component 104 can associate a PSO with a user object, based on the PSO corresponding to a certain precedence parameter such as having a lowest or minimum precedence number for example. In another embodiment, the directory component 104 can associate a PSO with a user object, based on the PSO having the greatest or maximum precedence number. Other PSO assignment methodologies can be implemented in accordance with a desired implementation.

As described above, a user can define or create an attribute-value set, such as a PSO for example, that can be associated with and assigned to a user object based on a number of rules, parameters, and/or other factors. In alternative embodiments, an application can be configured to define a number of attribute-value sets that can be dynamically associated with a number of user objects based on a given policy which can be implemented using precedence rules for example. For example, an attribute-value set can be associated with a particular password policy for an enterprise. If an attribute password length has a value of ten characters, then the attribute password expiration has a value defined as a number of days, months, etc.

Figure 3A:
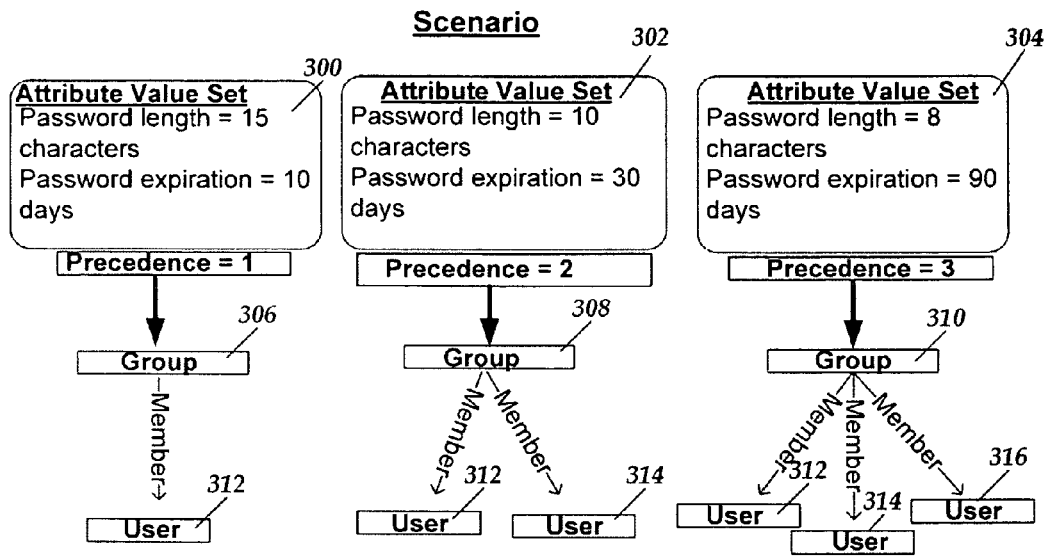
FIGS. 3A-3B depict an example scenario and result using a number of attribute-value sets.
Figure 3B:
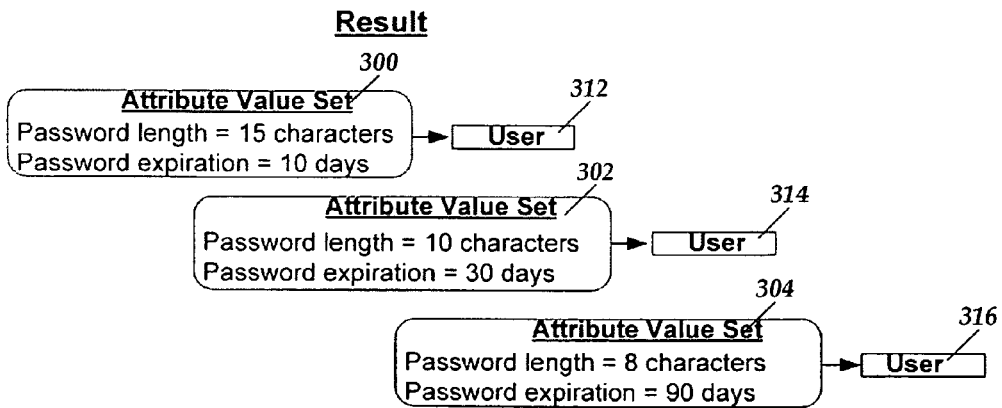

FIGS. 3A-3B depict an example scenario, wherein a directory application (see directory application 24 of FIG. 4) can operate to dynamically assign values associated with a number of attribute-value sets to user objects associated with a number of users. As shown in FIGS. 3A-3B, there are three attribute-value sets: attribute-value set 300, attribute-value set 302, and attribute-value set 304. Attribute-value set 300 includes an attribute password length having an associated value of 15 characters and an attribute password expiration having an associated value of 10 days. Attribute-value set 300 is associated with precedence number of one. Attribute-value set 302 includes an attribute password length having an associated value of 10 characters and an attribute password expiration having an associated value of 30 days. Attribute-value set 302 is associated with a precedence number of 2. Attribute-value set 304 includes an attribute password length having an associated value of 8 characters and an attribute password expiration having an associated value of 90 days. Attribute-value set 304 is associated with a precedence number of 3.

As described above, one or more values associated with an attribute-value set can be dynamically assigned to a user object based in part on group membership and other factors. Continuing with the example of FIGS. 3A-3B, each attribute-value set 300-304 can be resolved to an associated group or groups. The directory application (see directory application 24 of FIG. 4) can use information of a database to determine which attribute-value sets correspond to which groups. Correspondingly, attribute-value set 400 and its precedence number correspond with Group 306; attribute-value set 402 and its precedence number correspond with Group 308; and, attribute-value set 404 and its precedence number correspond with Group 310. Additionally, User 312 is a member of Groups 306, 308, and 310; User 314 is a member of Groups 308 and 310; and, User 316 is only a member of Group 310.

Once it has been determined which groups are associated with a particular user object, a password object for example, the directory application can dynamically assign attribute values associated with an attribute-value set (a password length and an expiration period for this example) to the user object based in part on group membership and/or precedence determination. For example, the directory application can use information associated with the database to determine which user belongs to which group or groups. Identity and other user information can be used as part of the group member determination.

For this example, the directory application can be configured to assign values of an attribute-value set having the lowest precedence number when a user belongs to multiple groups. Accordingly, since User 312 belongs to 3 groups (Groups 306-310), the directory application dynamically assigns the attribute-values corresponding to the attribute-value set having the lowest precedence number which is attribute-value set 300 having a precedence number of one. Since User 314 belongs to 2 groups (Groups 308 and 310), the directory application dynamically assigns the attribute-values corresponding to the attribute-value set having the lowest precedence number for those groups, which is attribute-value set 302 having a precedence number of 2. Finally, since User 316 belongs to only Group 310, the directory application dynamically assigns the attribute-values corresponding to the attribute-value set 304 to User 316. While an order of assignment is described in this example, the assignments can be simultaneously implemented or according to a different order.

As further example, assume there are 2 password settings objects (PSOs) having the following attributes and values:

1) PSO-Administrators: Precedence=1; Password length=15 characters; Password expiration=10 days.

2) PSO-Power-Users: Precedence=2; Password length=10 characters; Password expiration=30 days.

Also assume that the 'default values' for these attributes are:

Password length=8 characters; Password expiration=90 days.

Now, consider these 3 groups having the following members:

A) Domain users: user 1, user 2, user 3.
B) Power Users: user 2, user 3.
C) Administrators: user 3.

Further, assume that the 2 PSOs are linked to the following groups:

a) PSO-Power-Users→Power Users.
b) PSO-Administrators→Administrators.

As used in this example, the term "linked" refers to an association between PSO and a group (e.g., the PSO points to a group). As objects, a PSO and a group can occupy a row in an object table, wherein a unique number can be used to represent the PSO and the group, since each table row has a unique number. In one embodiment, a link table includes three columns: a source column, a target column, and a relationship column. Continuing with this example, the link table would include a row having PSO as the source, group as the target, and "Attached to" as the relationship, wherein the source and the target can be represented by the associated row numbers. In similar fashion, a user can be added (or linked) to a group. For this example, the user would be the source, the group would be the target, and "membership" would be the relationship.

Continuing with the example above, the resultant set of attributes and values that apply to a user object can be determined using the process depicted in FIG. 2. Using the flow of FIG. 2, User 3 can be associated with the attributes and corresponding values defined in "PSO-administrators", meaning that user 3 would be required to have a password length of at least 15 characters and to change their password at least every 10 days. User 2 would be associated with the attributes and corresponding values defined in "PSO-power-users", meaning that user 2 would be required to have a password length of at least 10 characters and to change their password at least every 30 days. Finally. User 1 would be associated with the attributes and corresponding values defined in the default policy, meaning that user 1 would be required to have a password length of at least 8 characters and be required to change their password at least every 90 days. In one embodiment, the system 100 can automatically inform a user of a new password policy and required password characteristics based on the selected attribute-value or attribute-value set.

The following example tracks a parking enforcement application. The administrator marks certain parking places as special and assigns users to certain groups. For example, there are 2 handicapped parking spaces, 10 vice president parking spaces, and 3 maintenance parking spaces. Further, there are 5 groups, "all maintenance employees", "all business operations employees", "maintenance vice presidents", "business operations vice presidents", and "handicap employees". A parking enforcement officer would go up to one car, read the license plate, figure out who's car it is, then ask the system if that person is allowed to park in the spot they are in (the spots they are allowed to park in is the attribute and the values are possible are handicapped, vp, maintenance and general parking). So, if they are parked in a handicap spot and they are not in that group, they get towed—meaning handicap has the highest precedence. Or say the person is a VP of maintenance (they are members of the groups "maintenance vice presidents" and "all maintenance employees"), then they can park in a VP spot or a maintenance spot or a general parking spot.

The following example tracks a hospital pain medication application. The administrator sets up groups according to what medical problems they have, and each group is associated with some types of medication. For example, people with headaches define one group, and the associated medication is pain medication=aspirin. Another group includes people recovering from laser eye surgery, and the associated medications are eye drops=anti-bacterial and pain medication=eye-drop numbing agent and aspirin. Another group includes people with a brain injury, and the associated medication is blood medication=thinner, and pain killer=morphine. Now, when a patient complains of pain, the nurse could input the patient's name into the pain medication application and see what pain medication to administer. If we assume the precedence is based on the severity of the pain medication, then a patient who simply has a headache gets aspirin and a patient recovering from laser eye surgery and has headaches gets eye-drop Novocain and aspirin, and a patient with a headache and a brain injury gets morphine, etc. The groups assist in defining attributes and values of pain medication.

As yet another example, a driver's license includes name, address and phone number attributes. Other attributes may include family, hometown, car type, etc., wherein all of the attributes and/or values may define a number of groups. That is, each group may include the same type of car, last name, etc. Certain attributes can be associated with certain groups and an attribute-value or attribute-value set can be associated with a group or groups based on a group membership determination and a precedence determination. For example, values associated with an attribute-value set can be dynamically assigned to a group based on the eye color of group members.

Exemplary Operating Environment

Figure 4:
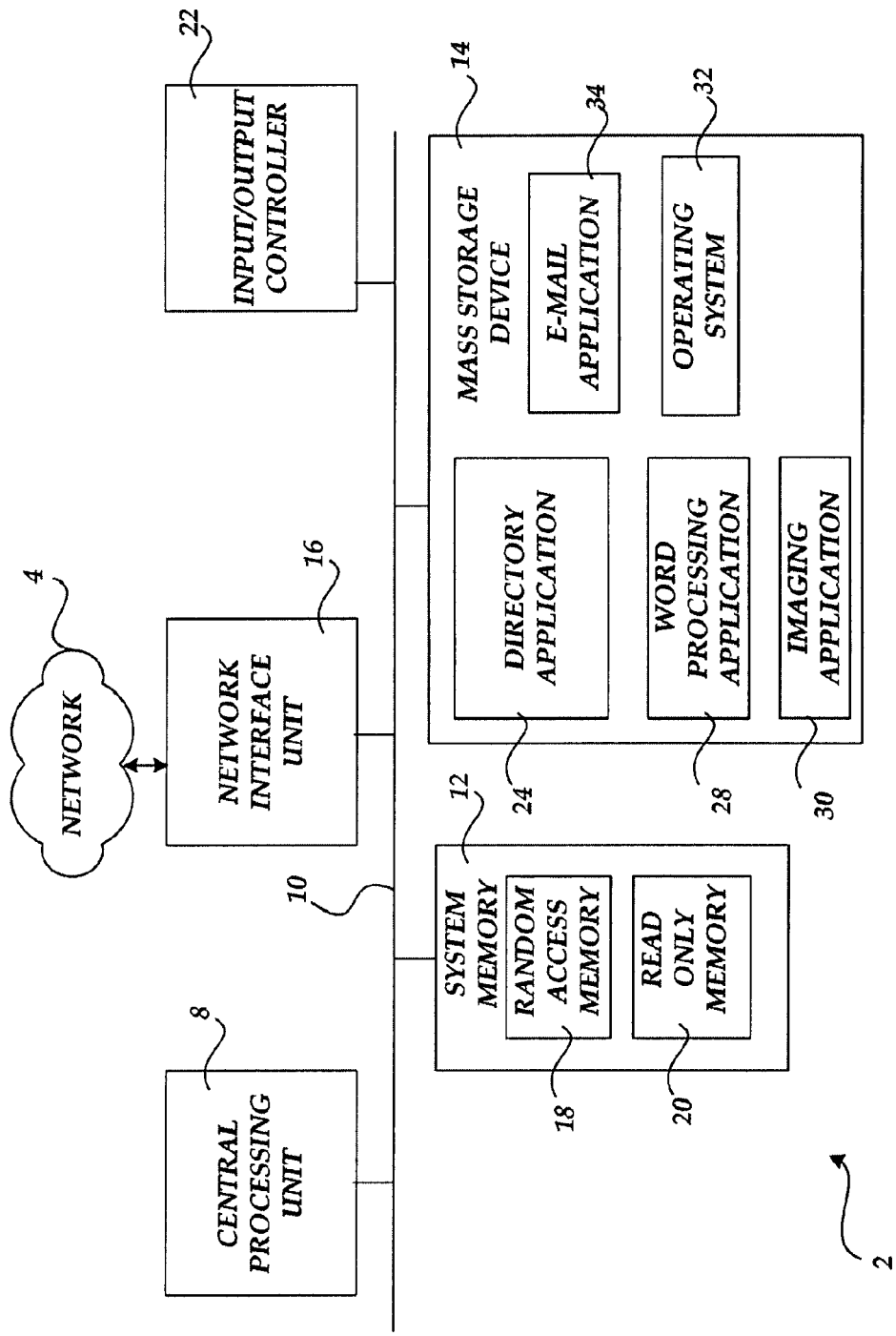
FIG. 4 is a block diagram illustrating an example computing environment for implementation of various embodiments described herein.

Referring now to FIG. 4, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 4, an illustrative operating environment for embodiments of the invention will be described. As shown in FIG. 4, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output: to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a directory application 24, word processing application 28, a spreadsheet application 30, e-mail application 34, drawing application, etc. As described above, the functionality of the directory application 24 can be included as part of the operating system functionality.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-readable storage medium coupled to a computing device including executable instructions which, when executed, manage information by:
    defining a number of groups associated with a computer environment, wherein one or more of the number of groups includes a group member according to a group membership determination;
    defining a number of attribute-value sets for each group, each attribute-value set being associated with a policy;
    associating a first precedence parameter and a first attribute-value set with a first group;
    associating a second precedence parameter and a second attribute-value set with a second group;
    associating a third precedence parameter and a third attribute-value set with a third group;
    using a number of precedence-based rules and precedence parameters to resolve a plurality of attribute-value sets when a user belongs to multiple groups including sorting the plurality of attribute-value sets using associated precedence parameters; and,
    dynamically assigning a resultant set of attribute-values including a first value associated with a first attribute-value pair and a second value associated with a second attribute-value pair to a user object associated with the computer-implemented environment when more than one attribute-value set is associated with the user object including determining which of the more than one attribute-value sets corresponds with the resultant attribute-value set based at least in part on an associated precedence parameter and the number of precedence-based rules, otherwise assigning a default policy to the user object.

2. The computer-readable storage medium of claim 1, wherein defining a number of attribute-value sets includes representing one or more attribute-values sets with one or more password setting objects (PSO), wherein each PSO includes a first password attribute-value set and a second password attribute-value set and using the precedence parameters in part to implement a password policy to a user included in multiple groups including a first type of user group and a second type of user group, wherein a higher precedence parameter is associated with the first type of user group.

3. The computer-readable storage medium of claim 2, wherein the instructions, when executed, manage information by selecting a resultant attribute-value set based at least in part on a precedence number and the group membership determination, wherein the resultant attribute-value set includes a PSO having a password length attribute-value pair, a password expiration attribute-value pair, and a complexity attribute-value pair.

4. The computer-readable storage medium of claim 1, wherein the instructions, when executed, manage information by implementing a password policy using a PSO which corresponds with a password attribute and a password value set including a complexity attribute and an associated value.

5. The computer-readable storage medium of claim 1, wherein sorting the plurality of attribute-value sets includes sorting the attribute-value set in a numerical order based on a value of the associated precedence parameter.

6. The computer-readable storage medium of claim 5, wherein determining which attribute-value set corresponds with the resultant attribute-value set includes selecting the resultant attribute-value set from the plurality of attribute-value sets, wherein the resultant attribute-value set corresponds to a minimum precedence number.

7. The computer-readable storage medium of claim 1, further comprising, determining a global group membership if no attribute-value set is applied to the user object and obtaining applicable attribute-value sets based on the global group membership, sorting the applicable attribute-value sets in order of precedence, wherein the attribute-value set with the highest precedence parameter is the resultant attribute-value set.

8. The computer-readable storage medium of claim 5, wherein determining which attribute-value set corresponds with the resultant attribute-value set includes selecting the resultant attribute-value set from the plurality of attribute-value sets, wherein the resultant attribute-value set corresponds to a maximum precedence number.

9. The computer-readable storage medium of claim 1, wherein defining a number of attribute-value sets includes defining the attribute-value sets as corresponding to a defined password policy, wherein each attribute-value set includes a password attribute and a password attribute value.

10. The computer-readable storage medium of claim 9, wherein defining a number of attribute-value sets includes defining each password attribute to correspond with characteristics of a password.

11. The computer-readable storage medium of claim 10, wherein defining a number of attribute-value sets includes defining a first attribute of a first attribute-value set as a password character limitation, and defining a second attribute of a second attribute-value set as a password expiration period.

12. The computer-readable storage medium of claim 1, wherein the instructions, when executed, manage information by ensuring that a password is in accord with a password policy by determining whether a password value associated with a password attribute is in accord with a defined password attribute-value set.

13. A computer system to manage information comprising:
  a database component including a number of groups and objects; and
  a directory component configured to dynamically assign one or more attribute-values associated with an attribute-value set to an object, wherein the directory component is configured to:
  associate a precedence parameter with each attribute-value set including a first precedence parameter and a first attribute-value set of a first group, a second precedence parameter and a second attribute-value set of a second group, and a third precedence parameter and a third attribute-value set of a third group;
  determine whether each attribute-value set is associated with one or more groups;
  use a number of precedence-based rules and precedence parameters to resolve a plurality of attribute-value sets when the object is associated with multiple groups, the number of precedence-based rules used to determine which attribute-value set to associate with a user object as part of resolving attribute-value sets and password policies for each user object;
  sort a plurality of attribute-value sets using associated precedence parameters when more than one attribute-value set is associated with the one or more groups; and
  select a resultant set of attribute-values including a first value associated with a first attribute-value pair and a second value associated with a second attribute-value pair to be associated with a user when more than one attribute-value set is associated with the user object including determining which of the more than one attribute-value sets corresponds with the resultant attribute-value set based at least in part on using the associated precedence parameter and the number of precedence-based rules to determine the resultant attribute-value set.

14. The computer system of claim 13, wherein the number of precedence-based rules includes a number of precedence-based conditions used to resolve attribute-value sets based at least in part on a numerical precedence evaluation.

15. The computer system of claim 13, further comprising an operating system (OS), wherein the directory component is configured to operate with the OS.

16. A computer-implemented computing method of managing information comprising:
  defining a number of groups, wherein one or more of the number of groups includes a group member;
  defining a number of password setting objects (PSOs), wherein each PSO is associated with a password policy;
  associating a precedence parameter with one or more of the PSOs, including associating a first precedence parameter and a first attribute-value set with a first group, associating a second precedence parameter and a second attribute-value set with a second group, associating a third precedence parameter and a third attribute-value set with a third group based in part on the one or more PSOs;
  using a number of precedence-based rules and precedence parameters to resolve attribute-value sets for multiple groups including sorting the attribute-value sets using associated precedence parameters; and
  selecting a resultant PSO including a first value associated with a first attribute-value pair and a second value associated with a second attribute-value pair for an associated group member when more than one PSO is available including using an associated precedence parameter and the number of precedence-based rules to determine which PSO corresponds with the resultant PSO, otherwise selecting a default policy for the associated group member.

17. The method of claim 16, wherein the organizing further comprises sorting the plurality of PSOs according to a defined order.

18. The method of claim 16, further comprising assigning a default password having default characters and default expiration parameters to the group member absent any PSOs.

* * * * *